United States Patent [19]

Hanma et al.

[11] Patent Number: 4,611,244
[45] Date of Patent: Sep. 9, 1986

[54] AUTO-FOCUS SYSTEM FOR VIDEO CAMERA

[75] Inventors: Kentaro Hanma; Toshio Murakami, both of Yokohama, Japan

[73] Assignee: Hitachi, Ltd., Tokyo, Japan

[21] Appl. No.: 623,082

[22] Filed: Jun. 21, 1984

Related U.S. Application Data

[63] Continuation of Ser. No. 377,438, May 12, 1982, abandoned.

[30] Foreign Application Priority Data

May 13, 1981 [JP] Japan ................................ 56-70720

[51] Int. Cl.[4] ............................................. H04N 3/26
[52] U.S. Cl. ..................................... 358/227; 358/225
[58] Field of Search .............. 358/227, 225, 228, 209, 358/55; 350/563, 564; 352/139, 140; 354/25, 44, 195, 197; 355/56

[56] References Cited

U.S. PATENT DOCUMENTS

| | | | |
|---|---|---|---|
| 4,152,061 | 5/1979 | Gordon | 358/140 |
| 4,161,756 | 7/1979 | Thomas | 358/227 |
| 4,191,460 | 3/1980 | Fujiki | 358/140 |
| 4,301,478 | 11/1981 | Sakane | 358/227 |
| 4,320,417 | 3/1982 | Hanma | 358/227 |
| 4,404,595 | 9/1983 | Ushiro | 358/227 |

FOREIGN PATENT DOCUMENTS 2458893 6/1975 Fed. Rep. of Germany.
2750580 5/1978 Fed. Rep. of Germany.

Primary Examiner—Tommy P. Chin
Attorney, Agent, or Firm—Antonelli, Terry & Wands

[57] ABSTRACT

An auto-focus system for a video camera having a zooming function includes an auto-focus signal generator for generating an auto-focus signal of the video camera. In particular, unlike conventional systems, auto-focus is accomplished by moving a master lens of the zoom lens system. A motor is coupled to at least a part of the master lens for this, and a motor controller performs the auto-focus operation by controlling the motor in accordance with the auto-focus signal. Further, a switch is provided which is changeable selectively between a first and a second mode instructing photographing over a normal distance range and over a macroscopic range respectively. A master lens controller controls the motor controller to decide a movable range of the master lens in accordance with the selected mode of the switch and to thereby control the motor controller to move the master lens within the decided movable range.

22 Claims, 9 Drawing Figures

AUTO-FOCUS SYSTEM FOR VIDEO CAMERA

This is a continuation of application Ser. No. 377,438, filed May 12, 1982, now abandoned.

BACKGROUND OF THE INVENTION

The present invention relates to an anto-focus system for a video camera, or more in particular to a system having an auto-focus function not only for photographing over a normal distance range but also for a close-up photo mode as well.

Conventional auto-focus systems for a video camera measure a distance between the camera and an object to be photographed on the principle of triangulation such as a double-image matching system and move an objective lens to a predetermined position by a motor in a manner to focus the objective lens to the measured distance.

Such systems or systems similar thereto have a sufficient auto-focus function over the normal photographing distance range of about 1 m to ∞ from the video camera to the object. However, when the distance is less than 1 m, particularly, in close-up photography or what is called macroscopic photography in which the distance is only several cm, auto-focus is impossible.

The auto-focus system of the triangulation type is inoperable for macroscopic photography mainly for following three reasons.

(1) In the triangulation type of focusing system or a system similar thereto, distance measurement of high accuracy is impossible over the large region from several cm to infinity. The triangulation type of focusing system measures the distance such that the deviation angle of a measuring mirror is made to correspond to the distance. Measurement of the distance in a range of several cm to infinity requires the mirror to deviate by an angle of several tens degrees, and it is not particularly feasible to deviate the mirror by such a large angle with high accuracy.

(2) When the distance between an object and the camera is about several cm, the parallax between the triangulation unit and the object lens becomes large, resulting in an increased probability that the measured distance does not always represent the actual distance from the camera to the object to the photographed.

(3) In the conventional auto-focus systems, the focusing operation is attained by controlling the rotation of a distance ring for the object lens. Since the focusing operation for the macroscopic range usually uses a zoom ring, however, macroscopic photography requires stopping the operation of the auto-focus system and adjusting the zoom ring manually for focusing.

These problems seem to be able to be solved by using such a system for correcting a mirror deviation angle with high accuracy, a system for correcting parallax, or a system for applying an auto-focus signal to the zoom ring instead of to the object lens for macroscopic photographing. In the present state of art, however, it is impossible to realize such systems. For the present auto-focus systems, therefore, a suggestion has been made to stop the auto-focus function at the time of macroscopic photographing.

Another example of the conventional auto-focus systems for obviating the above-mentioned disadvantages (1) and (2) of the triangulation type is disclosed in U.S. Pat. No. 4,320,417 entitled "Automatic Focusing System for Video Camera".

This prior art teaches the technique of passing the video signal from a video camera through a high-pass filter to obtain a high frequency component, sampling a voltage proportional to the fineness or extent of freedom from confusion of the television image (hereinafter referred to as focus voltage) by detecting the extracted high frequency component and bringing a focusing ring (hereinafter referred to as helicoid) to a position at which the focus voltage is maximum, i.e., a position of focus, by taking the difference between two consecutive sampled values and controlling the rotation of the helicoid by a reversible motor such that the difference is always positive.

Further, in order to prevent error in the measuring operation of the distance caused by the movement of the object being photographed or the panning of the camera, a movable range of the master lens is limited in accordance with the focal length thereof.

The above-mentioned U.S. Patent does not describe photographing in the macroscopic region.

SUMMARY OF THE INVENTION

Accordingly, it is an object of the present invention to provide an auto-focus system which obviates the above-mentioned short-comings of the conventional auto-focus systems for the video camera and is capable of auto-focusing function also for the macroscopic. photography range as well as normal photography distance range.

In order to achieve this object, according to the present invention, there is provided an auto-focus system for a video camera having a zoom function, comprising an auto-focus signal generator for generating an auto-focus signal of the video camera, a motor for moving at least a part of a master lens of the zoom lens system, a motor controller for performing an auto-focus operation by controlling the motor in accordance with the auto-focus signal, a switch being changeable selectively between a first and a second mode instructing the photographing over a normal distance range and over a macroscopic range respectively, and a master lens controller for controlling the motor controller so as to decide a movable range of the master lens in accordance with the selected mode of the switch and to thereby control the motor controller so as to move the master lens within the decided movable range.

Specifically, in order to permit the photographing of the macroscopic range, the master lens is used for focusing, and the movable range of the master lens for photographing over the normal distance is differentiated from the range thereof for the photographing in the macroscopic range.

DESCRIPTION OF THE PREFERRED EMBODIMENTS

Figure 1:
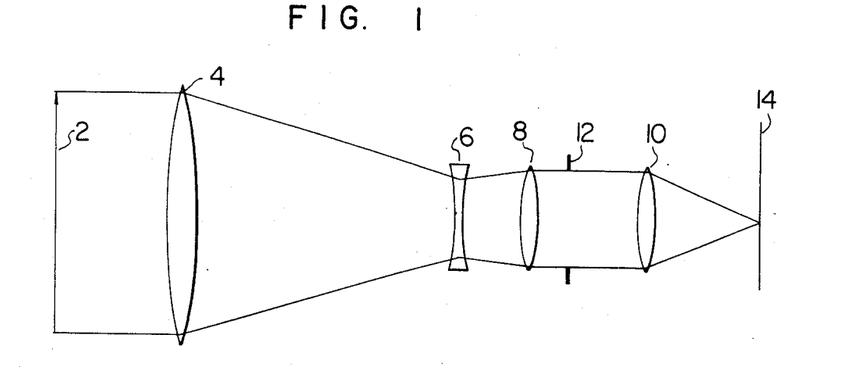
FIG. 1 is a diagram showing the construction of a zoom lens system of a video camera to which the present invention is applicable.

FIG. 1 shows a diagram for explaining the construction of a zoom lens system of a video camera to which the present invention is applicable. In FIG. 1, reference numeral 2 designates an object, numeral 4 an objective lens, 6, 8 a variator and a compensator lens, numeral 10 a master lens, numeral 12 a stop, and numeral 14 an image pickup element. The component elements 4 to 10 make up a zoom lens system. The master lens naturally includes a plurality of lenses which are partially or wholly movable for focusing according to the present invention.

Figure 2:
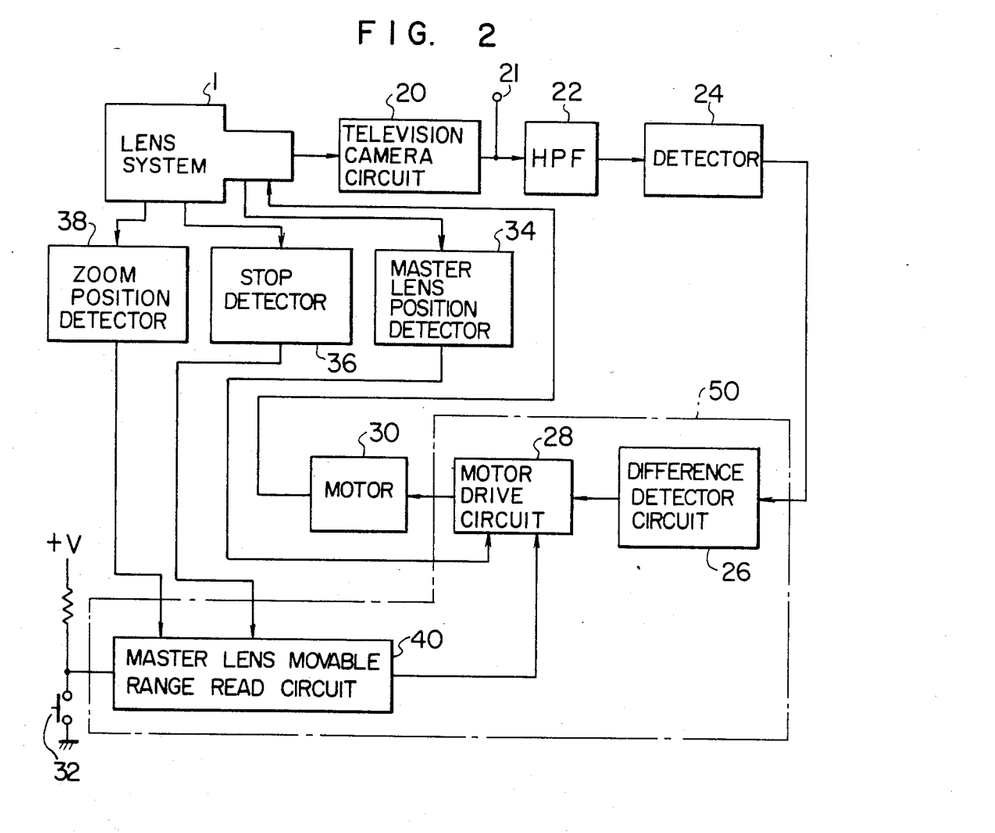
FIG. 2 is a block diagram showing the typical embodiment of the auto focusing system for the video camera according to the present invention.
Figure 3:
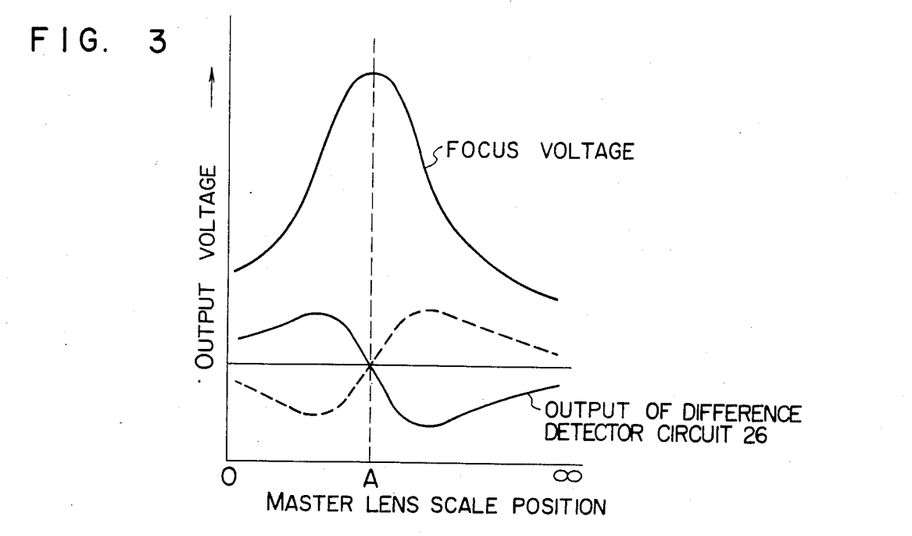
FIG. 3 is a schematic diagram for explaining the auto-focus operation.

The block diagram of FIG. 2 shows an embodiment of the auto-focus system for the video camera according to the present invention and concerns a case in which a video signal from the video camera is used for the auto-focus system. In FIG. 2, reference numerals 20 to 30 provide such a conventional auto-focus system as shown in U.S. Pat. No. 4,320,417, of which description will be made first of all. Referring now to FIG. 2, numeral 1 designates a lens system of a television camera, and 20 a television camera circuit including a video signal generator for converting a two-dimensional optical image formed by the lens system into a corresponding serial electric signal. The video signal is produced from the camera circuit and appears at an output terminal 21. It is also applied to a high-pass filter 22 to obtain a high frequency component corresponding to the fineness of the image, and this high frequency component is detected in a detector 24 to obtain a focus voltage proportional to the magnitude of the high frequency component signal. The focus voltage is dependent upon the fineness of the television image, and it is maximum when the television image is in focus. As shown in FIG. 3, in a case where the televised scene is at a distance A (m) from the camera, the focus voltage is maximum when the master lens is at a position of a graduation corresponding to A (m) and is reduced as the master lens departs from that position.

It will be understood from FIG. 3 that automatic focusing can be obtained through the control of the position of the master lens such as to maintain the maximum focus voltage.

A difference detector circuit 26 samples the focus voltage appearing from the detector 24 at a constant time interval and holds each sampled value, and also it produces a positive voltage when the focus voltage is increasing with the lapse of time and produces a negative voltage when the focus voltage is decreasing with the lapse of time. The output voltage of the difference detector circuit 26 is coupled to a motor drive circuit 28. The motor drive circuit 28 functions such that when the input voltage from the difference detector circuit 26 is positive, it continually causes the rotation of a motor 30 in the same direction as before for moving the master lens in the corresponding direction, while when the input voltage becomes negative it reverses the direction of rotation of the motor 30 for moving the master lens in the opposite direction, and when the input voltage changes to negative it stops the motor for stopping the master lens. Now, the motor drive circuit 28 may functions such that when the input voltage from the difference detector circuit 26 is zero or positive, it continually causes the rotation of the motor 30 in the same direction as before for moving the master lens in the corresponding direction, while when the input voltage becomes negative it reverses the direction of rotation of the motor 30 for moving the master lens in the opposite direction.

While the difference detector circuit output voltage shown in FIG. 3 corresponds to the case of moving the master lens away from the position thereof corresponding to a focus point in the close proximity of the camera to a position corresponding to an infinitely remote focus point, it will be readily understood that the output voltage is as shown by a dotted curve in case when the master lens is moved from the infinitely remote focus point toward the close proximity focus point.

With the above arrangement, the auto-focus operation can be obtained as the motor drive circuit causes the master lens to be driven by the motor 30 in a direction of climbing the hill of the focus voltage curve and eventually stops at a position corresponding to the apex of the hill according to the output voltage of the difference detector circuit 26. In another method of detecting the apex of the hill, when the input voltage from the difference detector circuit 26 changes to negative, the motor is driven reversely until the next negative turn of the input voltage so that the apex of the focusing voltage is determined as a position corresponding to intermediate of the two positions of the master lens at which the input voltage from the circuit 26 changed to negative.

It should be noted that the focusing operation of the zoom lens 1 by the auto-focus system shown by 20 to 30 is not effected by controlling the position of the objective lens like in the conventional systems but by controlling the position of the master lens according to the present invention.

A construction of the auto-focus system according to the present invention will be described.

In FIG. 2, numeral 32 designates a manual switch such as a push button switch for selecting the auto-focus operation over the normal distance region or the macroscopic distance region. When this push button switch 32 is open, a high-level signal is produced thereby to select the auto-focus operation over the normal distance region, while when the switch 32 is closed, a low-level signal is produced to select the auto-focus operation over the macroscopic distance region. Numeral 34 designates a master lens position detector including a potentiometer (not shown) for detecting the position of the master lens and producing an analog signal representing the detected position. Numeral 36 designates a stop detector including a potentiometer (not shown) for detecting the degree of opening of the stop 12 of the zoom lens 1 and producing an analog signal representing the detected opening degree. Numeral 38 designates a zoom position detector including a potentiometer (not shown) for detecting the zoom position of the lenses 6 and 8, namely, the focal length and producing an analog signal representing the focal length in interlocked relation with a zoom lever (not shown). Numeral 40 designates a master lens movable range read circuit for reading out a movable range of the master lens in response to input signals from the zoom position detector 38 and the push button switch 32. This circuit 40 may be arranged to be also responsive to an input signal from the stop detector 36.

The difference detector circuit 26, the motor drive circuit 28 and the master lens movable range read circuit 40 surrounded by a dot-and-dashed line are preferably composed of a microcomputer 50 according to the present invention, so that the functions of these circuits 26, 28 and 40 are attained by the microcomputer 50.

Figure 4:
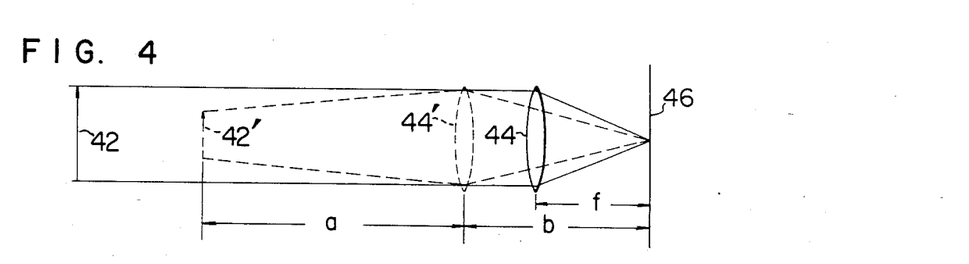
FIG. 4 shows a constructional diagram for explaining the relation between the master lens position and the focal length in the lens system.

Now, discussion will be made about a relation between a position of the master lens and the distance to the object capable of being focusing with respect to the position of the master lens. The movement of the master lens for focusing the lens system 4, 6, 8 and 10 may be replaced by the movement of a single lens 44 as shown in FIG. 4. In FIG. 4, let a distance from the single lens 44 to the object 42 be a, a distance from the lens to an image pickup element 46 be b and a focal length be f, a following equation is satisfied.

$$1/a + 1/b = 1/f \qquad (1)$$

Assume that the object is located at an infinite position from the lens as shown by solid line 42. The lens 44 is located at the position of the solid line for focusing. The position of the lens 44 under this condition is assumed to be a reference position. In this case, the distance b from the lens 44 to the image pickup element 46 is equal to f. If the object is located at the distance a from the lens as shown by dotted line 42', the lens moves to the position of the dotted line 44'. In this case, supposing that the distance from the lens to the image pickup element is b, an amount of movement of the lens from the reference position, i.e. a distance from the reference position, is (b−f). From equation (1), $$b = \frac{af}{a-f}$$

and therefore, the amount of the movement (b−f) is represented as follows.

$$b - f = \frac{af}{a-f} - f = \frac{f^2}{a-f} \qquad (2)$$

Figure 5:
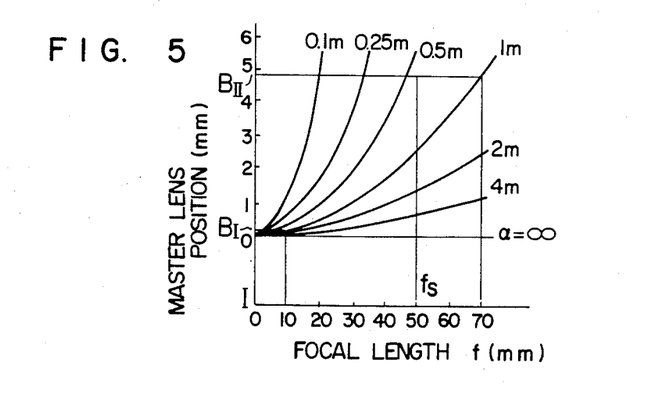
FIG. 5 is a graph showing the relation among the master lens position, the focal length and the distance from the camera to the object.

In view of the fact that the movement of the lens 44 is capable of being replaced by the movement of the master lens, the relation among the position of the master lens relative to the reference position (b−f), a distance to the object capable of being focussed with respect to the position of the master lens and the focal length f are represented as shown in FIG. 5. In FIG. 5, the curves show the relation between the focal length f and the position of the master lens relative to the reference position shown by 0 along the ordinate for various distances a from the master lens to the object. The point I along the ordinate represents the position of the image pickup element 46. As obvious from FIG. 5, when the distance to the object is infinitely large that is when a=∞, the position of the master lens is fixed at the reference position (i.e., b−f=0) regardless of the focal length, namely, the zoom magnification. When the object is nearer, however, the position of the master lens changes depending on the focal length. Specifically, when the focal length is maximum (zoom magnification is maximum) such as 70 mm, an amount of movement of the master lens necessary for focusing the object in the normal distance range from 1 m to ∞ is in a range from 0 to $B_{II}$ ($B_{II}$ is about 4.9 mm). When the focal length is minimum (zoom magnification is minimum) such as 10 mm, on the other hand, an amount of movement of the master lens necessary for focusing the same distance range is in a range of 0 to $B_I$ ($B_I$ is about 0.1 mm). In the case of photographing over the normal distance range, a distance a from the master lens to the object is quite a bit larger than a focal length f, so that the equation (2) can be substantially represented as follows.

$$b - f = f^2/a \qquad (3)$$

Thus, when the distance a of the object to be photographed is set in a range of $a_o$ to ∞, the maximum amount of the movement of the master lens is obtained as $f^2/a_o$ from the equation (3). Thus, the change of this required range of movement of the master lens due to the change of the focal length is substantially proportional to the square of the zoom magnification of the zoom lens. In other words, when the zoom magnification of 6 is involved, for example, the required range of movement of the master lens is approximately 36 times.

In the event that the object moves while being photographed or the camera is panned, the accurate distance to the object can not be detected, and the difference detector circuit 26 may operate erroneously and may drive the motor to a direction of out of focus.

In order to minimize the movement of the motor to the erroneous direction leading to a condition of out of focus by the above-described erroneous operation of the difference detector circuit 26 or the like, the autofocusing operation for the normal distance range to the object (such as 1 m to ∞) desirably has the function to limit the movable range of the master lens in accordance with the focal length. Specifically, when the focal length is set to be 70 mm, 40 mm and 10 mm, the movable range of the master lens is limited to 0 to 4.9 mm, 0 to 1.6 mm and 0 to 0.1 mm respectively, thus making it possible to minimize the erroneous movement of the motor. By limiting the movable range of the master lens, the power required for driving the master lens is saved on one hand and the object is focused within a shorter period of time on the other hand.

In order to perform these operations, the characteristics shown in FIG. 5 are contained as a formula or a table in the master lens movable range read circuit 40. In accordance with the output representing the focal length produced from the zoom position detector 38, the movable range of the master lens is read from the circuit 40, so that the motor 28 is controlled by the motor drive circuit 28 to cause the master lens to move within the read movable range, with reference to the output from the master lens position detector 34, thereby minimizing the distance of the movement of the master lens required for performing the focusing operation.

In the photographing over the macroscopic region where the distance to the object is, say, several cm to 1 m, on the other hand, the movable range of the master lens is not limited in accordance with the focal length but the master lens is movable up to the maximum position of $B_{II}$ ($B_{II}$ about 4.9 mm) regardless of the focal length. In this way, as compared with the case where movable range is limited, the shortest distance to the object capable of being photographed is greatly reduced. Assume that the shortest distance to the object in the photographing over the normal distance range is x m, the zoom magnification is y and the maximum distance of the master lens from the reference position is $B_{II}$, the shortest distance to the object capable of being photographed in about $x/y^2$. In other words, if the shortest distance to the object in the photographing over the normal distance range is 1 m and the zoom magnification is 6, the shortest distance to the object capable of being photographed in the macroscopic photographing is about 2.8 cm.

In order to perform this operation, in FIG. 2, the push button switch 32 is closed to select the macroscopic photography mode thereby setting the movable range of the master lens read by the master lens movable range read circuit 40 to 0 to $B_{II}$.

The characteristics of FIG. 5 may be corrected in accordance with the degree of opening of the stop 12. With the reduction of the degree of opening of the stop, the range of the movement of the master lens required in the photographing over the normal distance range is narrowed. Therefore, in accordance with the output of the stop detector 36, the read circuit 40 may correct the movable range of the master lens or read a correction value stored therein.

Figure 6:
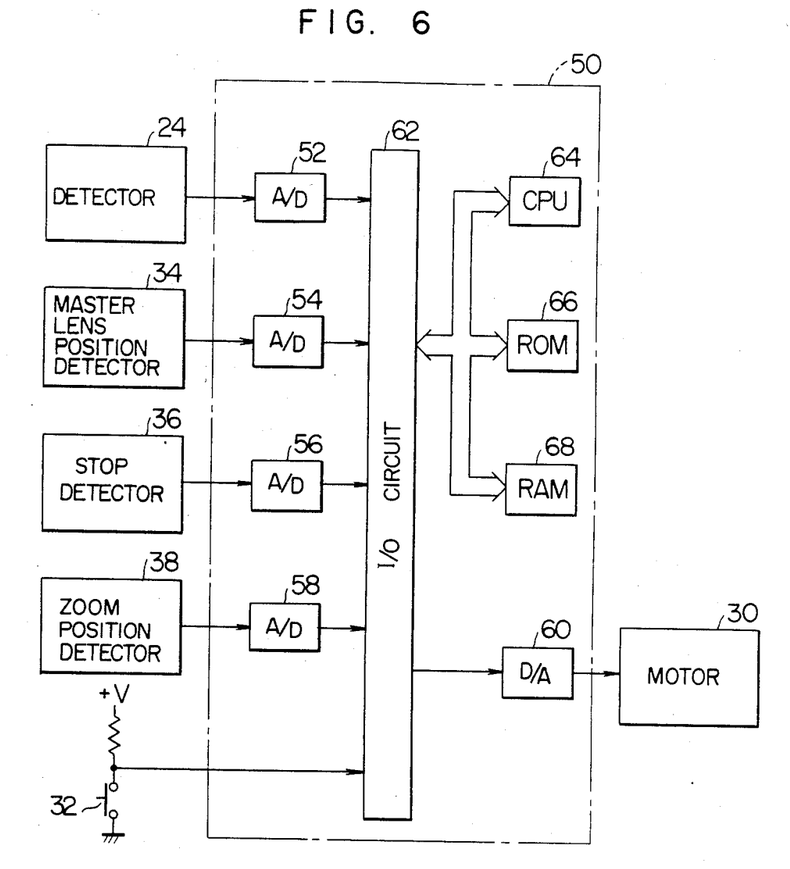
FIG. 6 is a block diagram showing a part of a typical embodiment of the auto-focus system for a video camera according to the present invention.

Now, the auto-focusing operation in the normal and macroscopic distance ranges will be explained. As described above, the difference detector circuit 26, the motor drive circuit 28 and the master lens movable range read circuit 40 in the auto-focusing system of FIG. 2 are constructed of a microcomputer 50 such as HMCS44 or HMCS45 of Hitachi Ltd. FIG. 6 shows a configuration of the microcomputer 50, in which outputs of the detector 24, the master lens position detector 34, the stop detector 36 and the zoom position detector 38 are applied through A/D converters 52, 54, 56 and 58 respectively to an I/O circuit 62. The output of the push button switch 32 is directly applied to the I/O circuit 62. The I/O circuit 62, CPU 64, ROM 66 and RAM 68 are connected with each other through buses. The output of the I/O circuit is connected through a D/A converter 60 to the motor 30.

Figure 8:
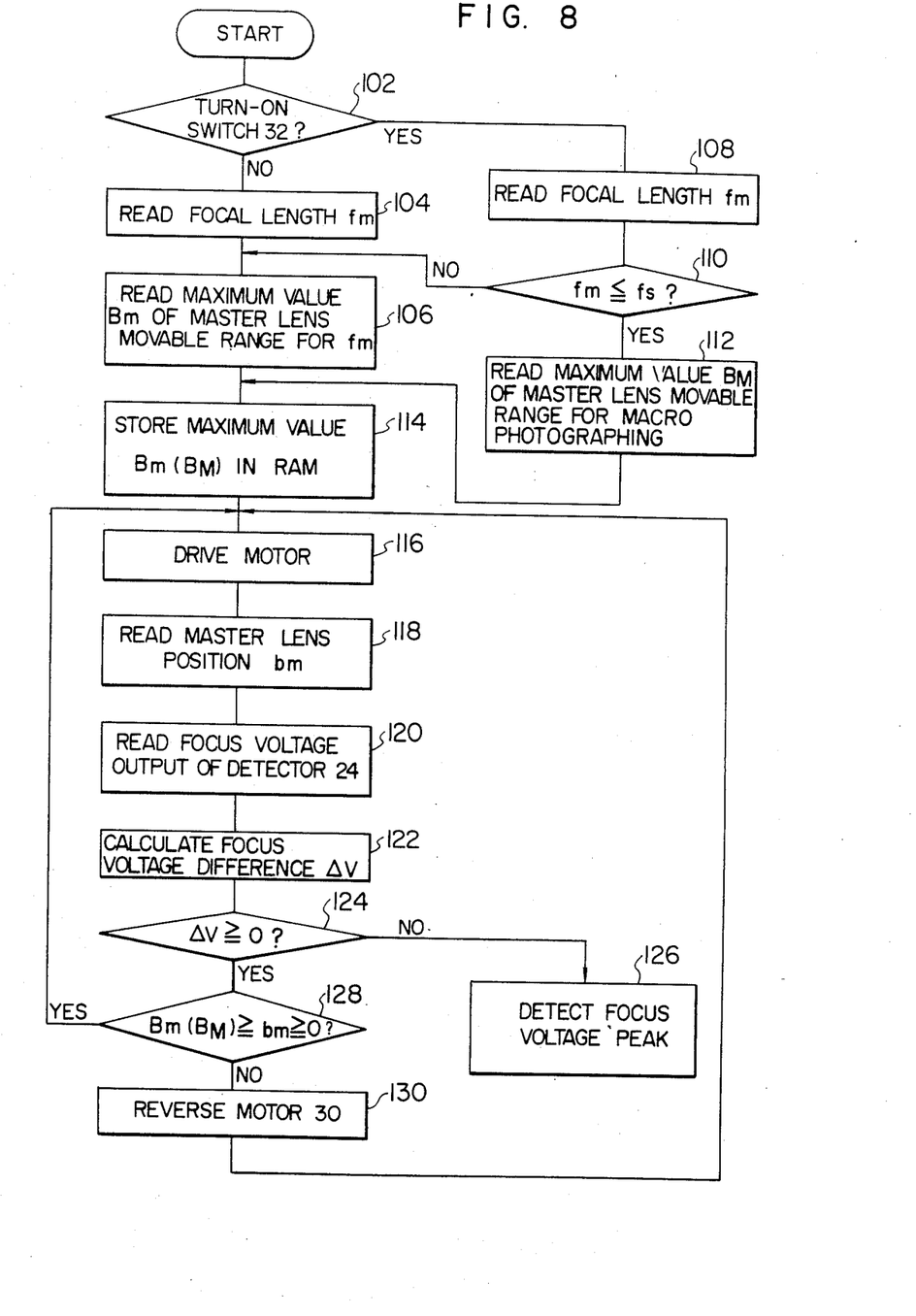
FIG. 8 is a flowchart for explaining the operation of an auto-focus system according to the present invention.

The operation of the auto-focus system according to the present invention will be described with reference to a flowchart of FIG. 8. This flowchart is executed in accordance with the program stored in the ROM 66.

First, at step 102, check is performed whether or not the push button switch 32 is turned on. If the switch 32 is turned on, it is decided that the macroscopic photographing is selected, and the process proceeds to step 108. If the switch 32 is turned off, on the other hand, it is decided that the photographing over the normal distance range is selected and the process proceeds to step 104.

Figure 7:
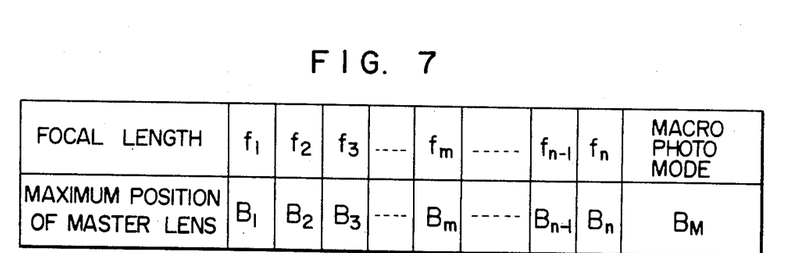
FIG. 7 is a table showing the data stored in a ROM in FIG. 6.

At step 104, a focal length is read from the zoom position detector 38, followed by step 106 where the maximum value of the movable range of the master lens (maximum value of position of the master lens) Bm corresponding to the focal lens (such as fm) read at step 106 is read from the ROM 66, which stores as shown in FIG. 7 the maximum value of the movable range of the master lens corresponding to each focal length shown in FIG. 5 for the photographing over the normal distance range.

At step 114, the maximum value Bm of the position of the master lens read at step 106 is stored at a predetermined address of the RAM 68, which also stores the minimum value, namely, zero of the position of the master lens.

In the case where the push button switch 32 is turned on, it is decided that the photographing of the macroscopic range is selected and the process proceeds to step 108, where the focal length fm is read from the output of the zoom position detector 38 through the A/D converter 58.

At step 110, it is decided whether or not the read focal length fm is smaller than a maximum focal length fs for the macroscopic range stored in the ROM. If fm is smaller than or equal to fs, it is decided that the focal length fm is such a value as permitting the macroscopic photographing and the process proceeds to step 112, so that a maximum value $B_M$ of the movable range of the master lens for the macroscopic photographing stored in the ROM is read and stored at a predetermined address of the RAM at step 114. The RAM also stores the minimum value, namely, zero of the movable range of the macroscopic photographing. $B_M$ may take a value equal to a maximum value Bn ($B_{II}$ in the case of FIG. 5) of the movable range for the photographing over the normal distance range.

If fm is larger than fs, on the other hand, it is decided that the photographing over the normal distance is selected, and the process proceeds to step 106.

Specifically, as shown in FIG. 5, if the focal length f is larger than a set value fs (such as 50 mm), the nearest distance to the object capable of being photographed with the maximum position of the master lens is so large (about 0.5 m for fs=0.5 mm) that the macroscopic photographing is impossible. As a result, the photographing over the normal distance range is preferable in such a case.

At step 106, the motor 30 is driven in a predetermined direction. Step 118 is for reading the position of the master lens through the A/D converter 54 from the output of the master lens position detector 34 and stores the read position of the master lens in the RAM 68.

Step 120 stores in the RAM 68 a focus voltage $V_n$ supplied from the detector 24 through the A/D converter 52. This step of reading the focus voltage is executed at regular intervals of time such as 1/60 seconds.

At step 122, the difference between the focus voltage Vn read at step 120 and a focus voltage $V_{n-1}$ stored in RAM and read on the preceding reading step of the focus voltage, that is, $V_n - V_{n-1} = \Delta V_n$ is computed.

Step 124 checks to see whether or not the difference $\Delta V$ thus obtained is larger than zero, and if it is equal to or larger than zero, the process proceeds to step 128, while if the difference $\Delta V_n$ is smaller than zero, the process proceeds to step 126.

At step 126, the routine is executed for detecting the apex of the hill formed by the focus voltage as shown in FIG. 2. In one method of detecting the apex of the hill, the motor is driven in reverse direction when the input voltage from the difference detector circuit 26 changes to negative side, and the motor is driven in reverse direction again when the input voltage changes to negative side again as mentioned above and this process is repeated continuously. Another well-known method may be used to detect the apex of the focus voltage. If the peak value of the focus voltage is obtained, the master lens is moved to a position corresponding thereto, thus focusing the lens system.

The step 128 is for checking to see whether or not the position of the master lens bm is within the movable range of the master lens set in the RAM at step 114, namely, between the maximum value Bm ($B_M$) and minimum value of zero. That is, it is checked to see whether or not the position of the master lens bm read at the step 118 satisfies the relation Bm ($B_M$)≧bm≧0. If Bm ($B_M$)≧bm≧0, the process returns to the step 116, where the motor is driven further in the same direction to execute the routine of the step 118 and subsequent steps.

If the relation Bm ($B_M$)≧bm≧0 is not satisfied, on the other hand, it is decided that the position of the master lens is outside of the movable range of the master lens, and the process proceeds to step 130, where the motor is driven in reverse direction thereby to lead the master lens within the movable range of the master lens. Then, the process returns to the step 116 where the motor 30 is driven in the same reverse direction for executing the step 118 and subsequent steps.

As described above, according to the present invention, the focusing operation is performed by moving the master lens, and the movable range of the master lens is changed between the photographing over the normal distance range and the photographing over the macroscopic range by turning on and off of the push button switch 32, thus making possible the auto-focusing operation for both the normal distance range and the macroscopic range.

Further, in photographing over the normal distance range, the movable range of the master lens is varied in accordance with the focal length thereby to prevent the erroneous focussing operation which otherwise might be caused by the panning of the camera or the like. Also, in photographing in the macroscopic range, the maximum position of movable range of the master lens is not varied but set to a predetermined maximum value regardless of the focal length, thus shortening the nearest distance to the object capable of being photographed.

In photographing over the normal distance range, the movable range of the master lens may be corrected in accordance with the degree of opening of the stop in the manner mentioned below. First, the changes of the maximum value and minimum value of the movable range of the master lens with respect to the changes of the degree of opening of the stop is stored in the RAM. After the step 106, the degree of opening of the stop is read from the stop detector 36 so that the maximum value and minimum value of the movable range read at the step 106 are corrected in accordance with the degree of opening of the stop and stored in the RAM.

In the case where a digital motor such as a pulse motor is used as the motor 30, the master lens position detector 34 and the A/D converter 54 are not required since the position of the master lens can be detected by counting drive pulses applied to the pulse motor.

In the foregoing description, the movable range of the master lens for the macroscopic photographing is set to 0 to $B_M$ ($B_M = B_{II}$) to permit the focusing operation up to an object located at infinite distance. Instead, the minimum value of the movable range may be set to a finite value not zero (such as 1 mm) so that the movable range of the master lens is reduced thereby to reduce the erroneous auto-focusing operation for the macroscopic photographing.

In the aforementioned embodiment, the push button switch 32 is capable of being manually turned on or off regardless of the focal length. In order to improve the operability by simplifying the operation of a home video camera or the like aimed at general consumers, however, the push button switch 32 may be so constructed that it can be operated only within a specified range of the zoom position.

Figure 9:
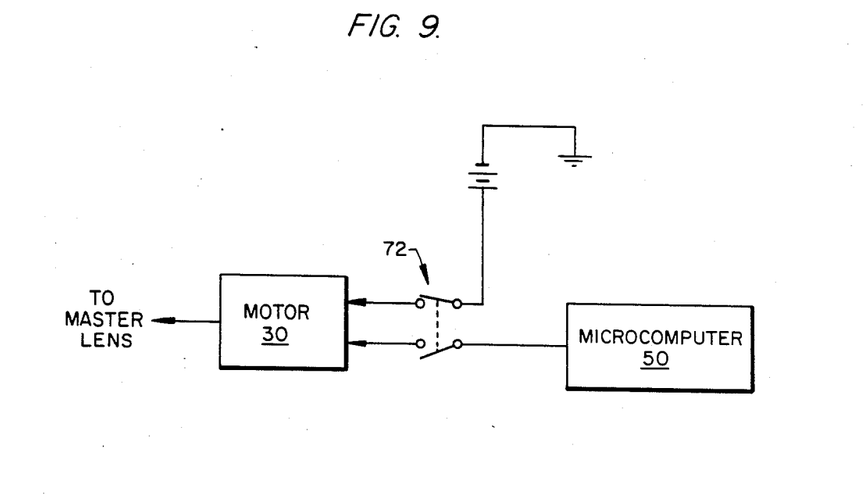
FIG. 9 is a block diagram showing an embodiment of the invention using an alternative auto-focus system.

Also, as shown in FIG. 9 an operating switch 72 for directly rotating the motor 30 may be added to the configuration of FIG. 2 thereby to make possible the manual focusing operation. In this case, a manual-auto change-over switch for changing between the auto focusing and manual focusing operations is of course required.

Further, instead of the auto-focus system using a video signal from a video camera as mentioned above, the present invention may be applied to other auto-focus systems such as that using a reflection signal of an ultrasonic wave signal radiated to an object.

Namely, as described above, according to the present invention a manual switch is provided for selecting the photographing over the normal distance range and the macroscopic range, and when the photographing over the normal distance range is selected the movable range of the master lens is limited to a smallest range enough for performing an auto-focus operation over the normal distance range to thereby save a required power of the motor, shorten a period of time for performing an auto-focus operation, prevent and erroneous operation of leading to out of focus and make longer the life of a mechanical part of driving the master lens. On the other hand, when the macroscopic photographing is selected, the movable range of the master lens is not limited to thereby shorten the nearest distance to the object capable of being photographed. Thus, the feature of present invention does not depend on the kinds of the auto-focus system and is applicable to other types of the auto-focus system.

We claim:

1. An auto-focus system for a video camera having a lens system comprising an objective lens located at the front of a zoom lens system to receive an optical image from an object being photographed and a master lens located between said zoom lens system and an image pickup unit of said video camera, said auto-focus system comprising:

means for generating an auto-focus signal in accordance with the fineness of said optical image for said video camera;

a motor for moving at least a part of the master lens of said lens system;

motor control means for performing an auto-focus operation by controlling said motor to move the position of said master lens to focus the lens system in accordance with said auto-focus signal;

switch means being changeable selectivly between a first and a second mode for instructing photographing over a normal distance range and over a macroscopic range respectively; and master lens movable range control means for controlling said motor control means to decide a movable range of said master lens in accordance with the selected mode of said switch means and to thereby control said motor control means to limit the movement of said master lens to be within the decided movable range.

2. An auto-focus system according to claim 1, wherein said auto-focus signal generator means extracts a signal corresponding to the fineness of a television image from a video signal representing the image picked up by said video camera and delivers the extracted signal as said auto-focus signal, and said motor control means controls said motor so as to maximize said auto-focus signal.

3. An auto-focus system according to claim 1, further comprising an operating switch being changeable selectively between a first state for instructing a manual drive of said master lens by directly rotating the motor in accordance with a manual focusing operation and a second state for instructing a motor drive of said master lens through said auto-focus system for an auto-focusing operation.

4. An auto-focus system according to claim 1, wherein said movable range control means includes a memory for storing movable ranges for the photographing of both the normal distance range and the macroscopic range, means for reading the movable range from said memory in accordance with the selected mode of said switch means and control means for controlling said motor control means so as to move said master lens within the read movable range 5. An auto-focus system according to claim 1, further comprising means for reading a focal length by detecting the zoom position of said zoom lens system, said movable range control means including means for limiting the movable range of said master lens in accordance with the read focal length when said switch means selects photographing over the normal distance range, and further including means for setting said movable range to a predetermined range regardless of the read focal length when said switch means selects the photographing over the macroscopic range.

6. An auto-focus system according to claim 5, wherein said movable range control means includes a memory for storing a first movable range varying in accordance with the read focal length for photographing over the normal distance range and a second movable range for photographing over the macroscopic range, means for reading the first movable range decided in accordance with the read focal length when the photographing over the normal distance range is selected by said switch means and for reading the second movable range regardless of the read focal length when the photographing over the macroscopic range is selected and means for controlling said motor control means so as to move said master lens within the read movable range.

7. An auto-focus system according to claim 5, wherein the zoom lens system further includes at least one zoom lens positioned between the objective lens and the master lens and wherein said zoom position of said zoom lens system is determined by the position of said zoom lens.

8. An auto-focus system according to claim 1, further comprising means for reading a focal length by detecting the zoom position of said zoom lens system, said movable range control means including means for setting the movable range of said master lens to a range corresponding to the photographing over the normal distance range in response to the read focal length being larger than a predetermined value, when said switch means selects the photographing over the macroscopic range.

9. An auto-focus system according to claim 8, wherein the zoom lens system further includes at least one zoom lens positioned between the objective lens and the master lens, and wherein said zoom position of said zoom lens system is determined by the position of said zoom lens.

10. An auto-focus system according to claim 1, wherein the zoom lens system further includes at least one zoom lens positioned between the objective lens and the master lens, and wherein a zoom position of said zoom lens system is determined by the position of said zoom lens.

11. An auto-focus system for a video camera having a lens system comprising an objective lens located at the front a zoom lens system to receive an optical image from an object being photographed and a master lens located between said zoom lens system and an image pickup unit of said video camera, said auto-focus system comprising:

means for generating an auto-focus signal in accordance with the fineness of said optical image for said video camera;
a motor for moving at least a part of the master lens of said lens system;
switch means being changeable selectively between a first and a second mode for instructing photographing over a normal distance range and over a macroscopic range respectively; and
a motor control circuit for controlling said motor to move the position of said master lens to focus said lens system in accordance with said auto-focus signal and the selected mode of said switch means, said motor control circuit including a computer, said computer deciding a movable range of said master lens in accordance with the selected mode of said switch means to thereby perform an auto-focus operation by controlling said motor in accordance with said auto-focus signal to limit the movement of said master lens to be within the decided movable range.

12. An auto-focus system according to claim 11, wherein said auto-focus signal generator means extracts a signal corresponding to the fineness of a television image from a video signal representing the image picked up by said video camera and delivers the extracted signal as the auto-focus signal, and said computer controls said motor so as to maximize said auto-focus signal.

13. An auto-focus system according to claim 11, further comprising an operating switch being changeable selectively between a first state for instructing a manual drive of said master lens by directly rotating the motor in accordance with a manual focusing operation and a second state for instructing a motor drive of said master lens through said auto-focus system for an auto-focusing operation.

14. An auto-focus system according to claim 11, wherein said computer includes a memory for storing movable range for the photographing of both the normal distance range and the macroscopic range, means for reading the movable range from said memory in accordance with the selected mode of said switch means and means for controlling said motor so as to move said master lens within the read movable range.

15. An auto-focus system according to claim 11, further comprising means for reading a focal length by detecting the zoom position of said zoom lens system, said computer limiting the movable range of said master lens in accordance with the read focal length when said switch means selects the photographing over the normal distance range, and setting said movable range to a predetermined range regardless of the read focal length when said switch means selects the photographing over the macroscopic range.

16. An auto-focus system according to claim 15, wherein said computer includes a memory for storing a first movable range varying in accordance with the read focal length for photographing over the normal distance range and a second movable range for photographing over the macroscopic range, means for reading the first movable range decided in accordance with the read focal length when the photographing over the normal distance range is selected by said switch means and for reading the second movable range regardless of the read focal length when the photographing over the macroscopic range is selected and means for controlling said motor so as to move said master lens within the read movable range.

17. An auto-focus system according to claim 15, wherein the zoom lens system further includes at least one zoom lens positioned between the objective lens and the master lens, and wherein said zoom position of said zoom lens system is determined by the position of said zoom lens.

18. An auto-focus system according to claim 11, further comprising means for reading a focal length by detecting the zoom position of said zoom lens system, said computer setting the movable range of said master lens to a range corresponding to the photographing over the normal distance range in response to the read focal length being larger than a predetermined value, when said switch means selects the photographing over the macroscopic range.

19. An auto-focus system according to claim 18, wherein the zoom lens system further includes at least one zoom lens positioned between the objective lens and the master lens, and wherein said zoom position of said zoom lens system is determined by the position of said zoom lens.

20. An auto-focus system according to claim 11, wherein the zoom lens system further includes at least one zoom lens positioned between the objective lens and the master lens, and wherein said zoom position of said zoom lens system is determined by the position of said zoom lens.

21. An auto-focus system for a video camera having a lens system comprising an objective lens located at the front of a zoom lens system to receive an optical image from an object being photographed and a master lens located between said zoom lens system and an image pickup unit of said video camera, said auto-focus system comprising:
   means for generating an auto-focus signal for said video camera;
   a motor for moving at least a part of the master lens of said lens system;
   motor control means for performing an auto-focus operation by controlling said motor to move the position of said master lens to focus the lens system in accordance with said auto-focus signal;
   switch means being changeable selectively between a first and a second mode for instructing photographing over a normal distance range and over a macroscopic range respectively; and
   master lens movable range control means for controlling said motor control means to decide a movable range of said master lens in accordance with the selected mode of said switch means and to thereby control said motor control means to limit the movement of said master lens to be within the decided movable range.

22. An auto-focus system for a video camera having a lens system comprising an objective lens located at the front of a zoom lens system to receive an optical image from an object being photographed and a master lens located between said zoom lens system and an image pickup unit of said video camera, said auto-focus system comprising:
   means for generating an auto-focus signal for said video camera;
   a motor for moving at least a part of the master lens of said lens system;
   switch means being changeable selectively between a first and a second mode for instructing photographing over a normal distance range and over a macroscopic range respectively; and
   a motor control circuit for controlling said motor to move the position of said master lens to focus said lens system in accordance with said auto-focus signal and the selected mode of said switch means, said motor control circuit including a computer, said computer deciding a movable range of said master lens in accordance with the selected mode of said switch means to thereby perform an auto-focus operation by controlling said motor in accordance with said auto-focus signal to limit the movement of said master lens to be within the decided movable range.

* * * * *